(12) United States Patent
Hunter et al.

(10) Patent No.: US 7,869,902 B2
(45) Date of Patent: Jan. 11, 2011

(54) INTELLIGENT SEED TREATMENT SYSTEM AND METHOD

(75) Inventors: James L. Hunter, Maxwell, IA (US); Timothy P. Meyer, Des Moines, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 205 days.

(21) Appl. No.: 11/939,247

(22) Filed: Nov. 13, 2007

(65) Prior Publication Data

US 2009/0125552 A1    May 14, 2009

(51) Int. Cl.
*G06F 17/00* (2006.01)
(52) U.S. Cl. ...................................... 700/240
(58) Field of Classification Search .............. 700/28, 700/239, 240; 53/111 R, 420
See application file for complete search history.

(56) References Cited

U.S. PATENT DOCUMENTS

| 5,632,819 | A | * | 5/1997 | Geissler | 118/712 |
|---|---|---|---|---|---|
| 6,078,635 | A | * | 6/2000 | DuBois | 377/6 |
| 6,186,194 | B1 | * | 2/2001 | Poupon | 141/83 |
| 6,582,516 | B1 | | 6/2003 | Carlson | |
| 2005/0060958 | A1 | | 3/2005 | Harmon et al. | |
| 2008/0009962 | A1 | | 1/2008 | Hood et al. | |

FOREIGN PATENT DOCUMENTS

GB          2 351 488 A       1/2001

OTHER PUBLICATIONS

GTG, "Spectracota™," <http://www.germains.com/products.asp?i=74>, printed Jul. 19, 2007.
ALMACO, "Automated Processing Line," <http://www.almaco.com/products/productDetail.cfm?ProductID=80>, printed Sep. 10, 2007.
Bayer CropScience, Gustafson, "Batch Modular Coater: Installation and Operation Manual," <http://www.bayercropscience.com/BAYER/CropScience/BCSUS.nsf/files/Commercial%20Manuals/$file/bmc_man.pdf>, copyrighted 2005.
International Search Report and Written Opinion for International Appl. No. PCT/US2008/051742, mailed Jul. 23, 2008.

* cited by examiner

*Primary Examiner*—Albert Decady
*Assistant Examiner*—Chad Rapp
(74) *Attorney, Agent, or Firm*—Alston & Bird LLP (57) ABSTRACT

A system and method for treating a least a portion of an initial seed sample to create one or more treated seed samples is provided. In various embodiments, one or more seed treatment apparatus components are in communication with one or more controllers such that seed samples treated by a seed treater may be treated at least in part based on one or more instruction sets that may be associated with one or more research plans. As a result, the method and system are configured to accurately, consistently, and predictably treat seed samples, and to adapt and change the treatment of seed samples based on changing research plans.

19 Claims, 5 Drawing Sheets

FIG. 5

INTELLIGENT SEED TREATMENT SYSTEM AND METHOD

FIELD OF THE INVENTION

The various embodiments of the present invention relate generally to a system and method for treating an initial seed sample or portions thereof for use in research applications. More specifically, embodiments of the present invention provide a controlled system and method for treating an initial seed sample or portions thereof to create treated seed samples.

BACKGROUND OF THE INVENTION

Plant breeding, plant product development, plant product characterization, and plant product commercialization processes often require, for each genotype or breeding line, the creation of a large number of seed samples from a bulk or composite seed sample. For example, in agricultural research, it is often necessary to segregate a seed sample from a bulk sample such that the seed sample includes one or more selected seeds (representing a statistically-significant population, for example). Such seed samples must also sometimes be treated with a selected treatment compound (such as a particular fungicide or insecticide, for example) and packaged with a unique indicia that allows a researcher or field technician to easily identify the seed sample, as well as the handling history and treatment history of the seed sample.

High-throughput seed sample processing systems for corn and other plant seeds are described, for example, in U.S. Pat. No. 6,706,989, which is assigned to the assignee of the present application and which is incorporated herein by reference in its entirety. Such systems provide automated high-throughput capacity for cleaning and sorting a sample of seeds and placing the sample in a bag or other container with identifying information. However, conventional labor-intensive processes must be used in downstream steps, such as, for example steps for treating the sample of seeds or a portion of the sample, and for packaging seed samples into seed packets or other containers in preparation for planting or additional downstream processes. In conventional methods, these steps are carried out manually, in what is an especially time consuming process. Typically, for treating a seed sample, an initial seed sample is first manually loaded into a seed treater. Treatment material is then applied to the sample by control of an operator. Typically, the seed treater is manually started and the treatment process ends when a timer stops the process. Although seed treatment devices may vary in design, typical seed treatment devices operate by applying an aqueous seed treatment material to the seed sample and then drying the treated seed sample. Much of the processing time of a seed treatment method is attributable to the drying step. Once the seed sample is sufficiently treated and dried, the treated sample is discharged from a funnel or the bottom of a hopper.

In a research setting, the ability to quickly, accurately, consistently, and predictably treat seed samples is extremely important. However, conventional research methods rely heavily on the same manually operated processes described above. Reliance on manual processes and written records prevents conventional methods from quickly and accurately adapting to changes in research plans, including changes to seed sample treatments contained in the research plans. Additionally, because conventional research methods rely on written records to maintain the identification and traceability of treated seed samples, such reliance could introduce error that may be detrimental to the integrity of the results of experiments that rely on accurate and consistent seed sample treatments and accurate documentation of the treatments applied to each seed sample.

As a result, there is a need in the art for an improved system and method of treating portions of an initial seed sample. The system and method should provide controlled processes and should accurately, consistently, and predictably treat seed samples. Additionally, the system and method should be flexible and should be able to treat seed samples according to changing research plans. There further exists a need in the art for a system and method that accurately records and preserves information associated with treated seed samples.

SUMMARY OF THE INVENTION

The embodiments of the present invention satisfy the needs listed above and provide other advantages as described below. Embodiments of the present invention may include a method for treating a least a portion of an initial seed sample to create one or more treated seed samples. In addition, the present invention also provides various embodiments directed to a system for treating at least a portion of an initial seed sample to create one or more treated seed samples.

In one embodiment, the present invention provides a method that comprises distributing at least a portion of the initial seed sample to a seed treater of a seed treatment apparatus, applying at least one seed treatment material to the portion of the initial seed sample distributed to the seed treater, and controlling the seed treatment apparatus with at least one controller for applying the at least one seed treatment material to the portion of the initial seed sample distributed to the seed treater, wherein the controller controls the seed treatment apparatus at least in part according to one or more instruction sets to create one or more treated seed samples. In some embodiments, the one or more instruction sets may be extracted or derived from one or more research plans and may be stored in at least one data store. Some embodiments further comprise communicating input from an input device to the at least one controller. In some embodiments, this may comprise reading identification data associated with at least one of the initial seed sample or the one or more treated seed samples using an input device and communicating the identification data to the at least one controller.

In some embodiments, the step of distributing at least a portion of the initial seed sample to a seed treater of a seed treatment apparatus comprises distributing at least a portion of the initial seed sample to a metering station, distributing at least a portion of the portion of the initial seed sample from the metering station to a seed treater, and quantifying the portion of the initial seed sample distributed by the metering station with a quantifying device. In some embodiments, the step of applying at least one seed treatment material to the portion of the initial seed sample distributed to the seed treater is based at least in part on the quantifying step. In some embodiments, the steps of distributing at least a portion of the initial seed sample to the seed treater and applying at least one seed treatment material to the portion of the initial seed sample distributed to the seed treater occur automatically via control by at least one controller.

In some embodiments, the steps of distributing at least a portion of the initial seed sample to a metering station, distributing at least a portion of the portion of the initial seed sample from the metering station to the seed treater, and quantifying the portions of the initial seed sample distributed by the metering station with a quantifying device, occur automatically via control by at least one controller. In some embodiments, the controller controls the seed treatment apparatus at least in part according to the one or more instruction sets by varying at least one of a rate of application of a seed treatment material, an amount of seed to be treated, a seed treatment material to be applied, or combinations thereof. Some embodiments further comprise printing one or more labels containing information associated with the one or more treated seed samples. In some embodiments, the step of quantifying the portion of the bulk seed sample distributed by the metering station comprises measuring at least one of seed count data, seed weight data, or seed volume data, and wherein the method further comprises storing at least one of the seed count data, the seed weight data, or the seed volume data in one or more data stores. Some embodiments further comprise storing data relating to the one or more treated seed samples in at least one data store.

Thus, the various embodiments of the seed sample treatment method and system provide many advantages that may include, but are not limited to: providing a method and system capable of accurately, consistently, and predictably treating seed samples; providing flexibility to treat seed samples according to changing research plans; and accurately recording and preserving information associated with treated seed samples. These advantages, and others that will be evident to those skilled in the art, are provided in the package assembly of the present invention.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Although the embodiments of the present invention may be useful by themselves, they are also useful in conjunction with the systems, methods, and computer program products disclosed in U.S. patent application Ser. No. 11/774,230, which claims priority to U.S. Provisional Patent Application No. 60/806,684, both of which are assigned to the assignee of the present application and both of which are incorporated herein by reference in their entirety.

Figure 1:
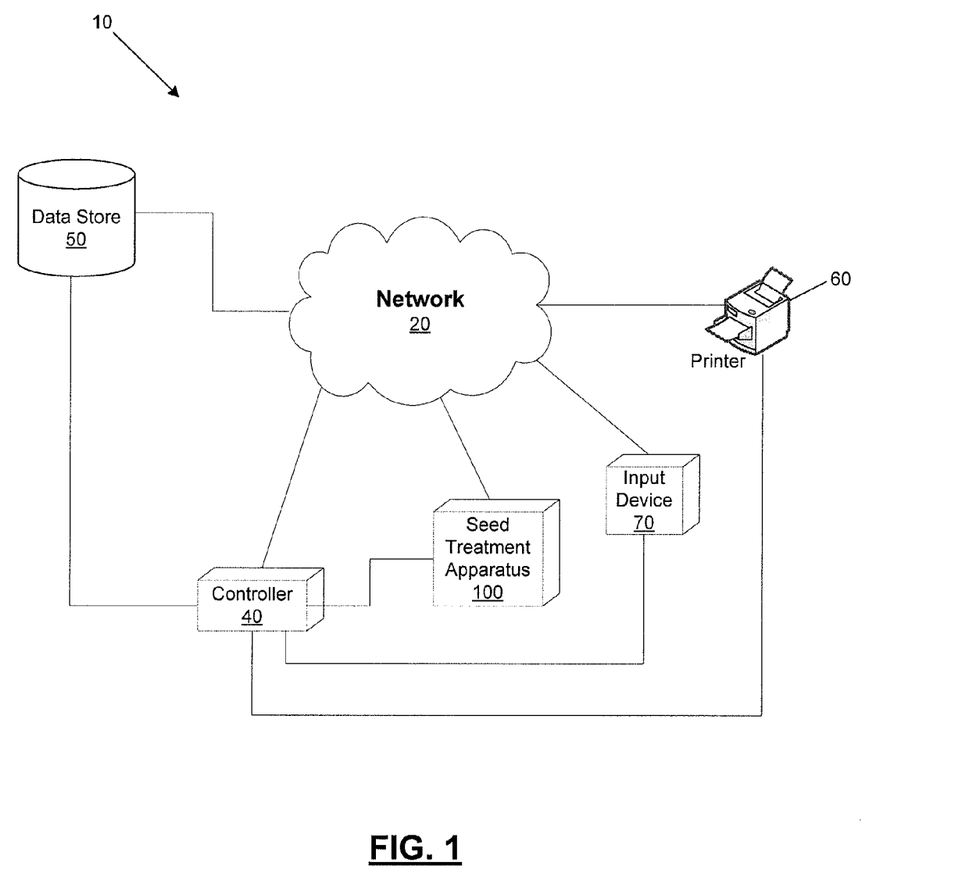
FIG. 1 is a schematic representation of a network environment configured for treating a least a portion of an initial seed sample to create one or more treated seed samples in accordance with one exemplary embodiment of the present invention.

FIG. 1 illustrates an exemplary system 10 that includes a seed treatment apparatus 100 for treating a least a portion of an initial seed sample to create one or more treated seed samples. Although only one seed treatment apparatus 100 is shown in system 10, in other embodiments there may be a plurality of seed treatment apparatuses. In the depicted embodiment, the seed treatment apparatus 100 communicates over a network 20, although in other embodiments the seed treatment apparatus 100 may operate autonomously and need not require a network. In various embodiments, the network 20 may be a LAN, a WAN, the Internet, etc. The seed treatment apparatus 100 of the depicted embodiment communicates with and is controlled by at least one controller 40. The system 10 of the depicted embodiment also includes an input device 70. In the depicted embodiment, the input device 70 communicates with the controller 40. In various embodiments, examples of an input device may include, but need not be limited to, a barcode scanner, a keyboard, a radio frequency identification (RFID) reader, a touch-screen device, a load cell, a stepper motor, a weight scale, a proximity sensor, an optical sensor, a workstation, a data store, or any other system, apparatus, device or combination thereof configured to at least provide input to the controller 40. In various embodiments, input may refer to a signal, data, portions of data (including an individual bit), or any other type of information capable of being communicated locally or over a network. In some embodiments, an input device may be capable of one-way communication with the controller, such that the input device may only send input to the controller. In other embodiments, the input device may be capable of two-way communication with the controller, such that the input device may communicate input to the controller and receive communication from the controller. Although the seed treatment apparatus 100 and the input device 70 are shown communicating directly with the controller 40, in some embodiments, communication may take place via the network 20. It should be noted that although the depicted embodiment shows a separate input device 70, in other embodiments, one or more data input devices may be part of the seed treatment apparatus 100. For the purposes of the current specification and appended drawings and claims, the terms controller, control system, and other forms thereof, refer to any one or any combination of devices that may be used for controlling, including, but not limited to a personal computer (PC), a server, a programmable logic controller (PLC), an embedded controller, timers, processor devices, and other similar devices. In various embodiments, one or more processes may be controlled by one or more controllers, which may include one or more controller types. For example, in some embodiments, a combination of controllers may control one process. In other embodiments, a combination of controllers may control a combination of processes. In other embodiments, one controller may control all processes. In still other embodiments, different controllers may control different processes. Additionally, any combination of controller types is possible. For example, one or more processes may be controlled by a controller of one type, and another process or other processes may be controlled by one or more controllers of another type.

In the depicted embodiment, the controller 40 is configured to access and/or to receive at least one instruction set, which may derived or extracted from one or more research plans. Although the controller 40 may receive an instruction set in any manner, in the depicted embodiment, the controller 40 communicates with a data store 50, which stores one or more instruction sets. Although not shown in the figure, in some embodiments, the system 10 may also include a web server by which data from the data store 50 may be communicated over the network 20. It should be noted that although the controller is referred to as accessing and/or receiving at least one instruction set, which may be derived or extracted from one or more research plans, for the purposes of the current specification and appended drawings and claims in some embodiments this may comprise accessing and/or receiving one or more research plans.

In various embodiments, the data store 50 and/or one or more instruction sets stored in the data store 50 may, for example, aggregate seed sample requirements, specify specific treatment requirements, and/or include quantification information (e.g., seed sample weights, seed sample volumes, or seed sample counts). According to various embodiments, information within an instruction set may include, but is not limited to, treatment types and application rates, a count of the number of the seeds within a seed sample, a weight of the seeds within a seed sample, a volume of the number of seeds within a seed sample, and combinations of such data. In other embodiments, the controller 40 may receive one or more instructions sets in a variety of other ways. For example, in some embodiments a radio frequency identification (RFID) transponder may store one or more instruction sets. For example, an RFID transponder may be associated with an initial seed sample. In such embodiments, the data input device may include an RFID reader.

Although the controller 40 of the depicted embodiment is shown communicating with the data store 50 over the network 20, in other embodiments the controller 40 may communicate directly with the data store 50. It should be noted that for the purposes of the current specification and appended drawings and claims, the term data store may include, but is not limited to, a database, text file, relational database, or any other manner of storing data. In some embodiments, the controller 40 may also communicate directly with a printer 60, however communication with the printer 60 may also occur over the network 20. Thus, in some embodiments the network 20 may provide local connectivity between the seed treatment apparatus 100, the data store 50, the controller 40, the data input device 70, and/or the printer 60.

As will be discussed in more detail below, in various embodiments one or more instruction sets may be used by the controller 40 to create one or more treated seed samples. In such a manner seed samples may be treated by the seed treatment apparatus 100 according to instruction sets that may be updated, such as, for example, by communicating changes to instruction sets over the network 20. Current manual processes do not monitor research plans and thus are not able to quickly and accurately change and adapt. For example, operators of manual prior art processes have no easy means of knowing when research plans are developed and/or altered and whether such development or alteration affects the disposition of samples for treating. Additionally, manual prior art processes provide no simple means of monitoring research plans and identifying entries or genotypes within experiments for which the planning process is complete and thus are ready to be treated. By providing the controller 40 with access to one or more instruction sets associated with one or more research plans (such as, for example, by communication between the controller 40 and the data store 50 over the network 20), various embodiments of the present invention may quickly adapt to changes in the one or more research plans or instruction sets associated therewith. Additionally, by providing the controller 40 with access to one or more instructions sets, various embodiments of the present invention may facilitate work flow management by prioritizing and/or otherwise managing the treatment of seed samples.

Additionally, by allowing communication between the controller 40 and the other components shown in FIG. 1, readable labels may be generated that contain identifying indicia and/or other information associated with the treated seed samples. Information associated with said labels may include, but need not be limited to, information about particular seed treatments that have been applied to the seed samples and/or warning or caution language associated with the treated seed samples. In some embodiments, this information may be stored in the data store 50. By storing this information in the data store 50, this information may be updated independently, thus allowing identifying indicia and/or other information to be more accurate and up to date.

Figure 2:
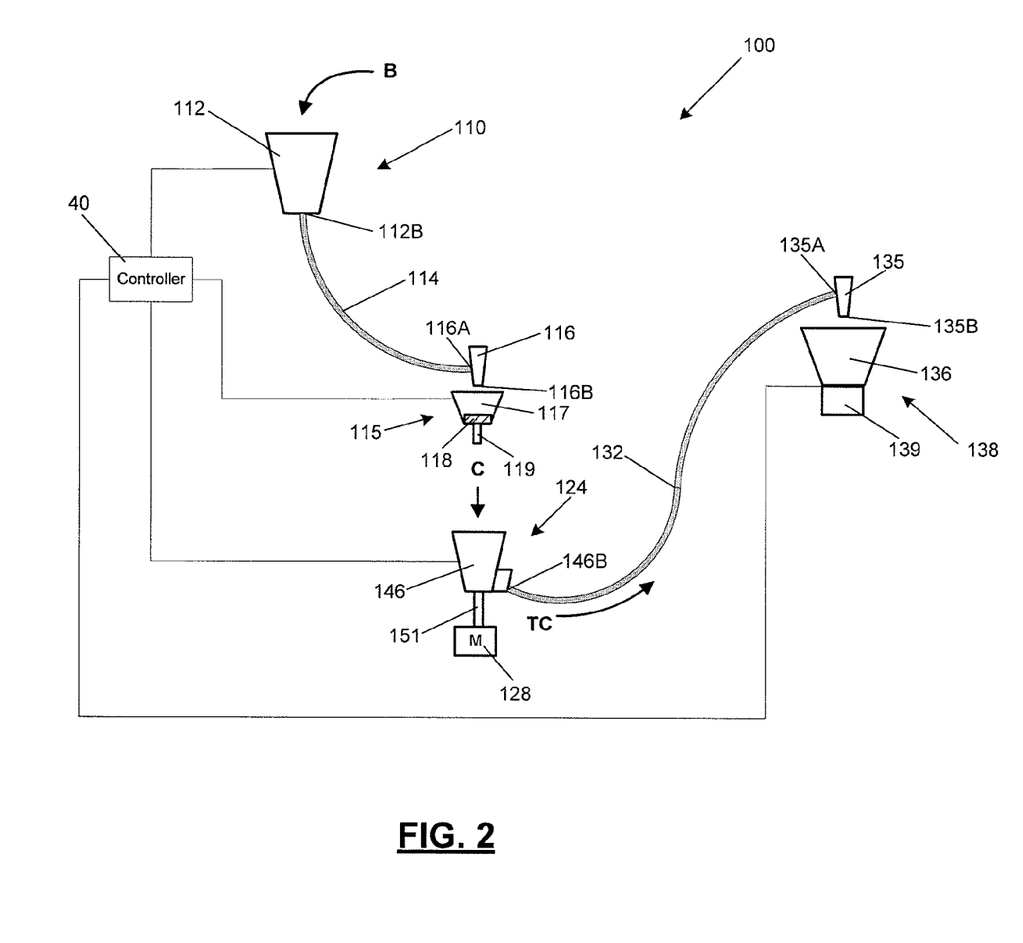
FIG. 2 shows a schematic view of a seed treatment apparatus in accordance with one embodiment of the present invention.

A schematic view of a seed treatment apparatus 100 in accordance with one embodiment of the present invention is shown in FIG. 2. In general, the seed treatment apparatus 100 of the depicted embodiment includes a bulk loading station 110, a metering station 115, and a seed treater 124. It should be noted that in many embodiments, a bulk loading station 110 need not be included, as seed samples may be loaded directly into the metering station 115. In various embodiments, a controller 40 may be included that controls one or more of various components of the seed treatment apparatus 100, including but not limited to, the bulk loading station 110, the metering station 115, the seed treater 124, and/or the packaging station 138. To initiate the treating process, an initial seed sample B is loaded at the bulk loading station 110, which generally includes a loading hopper 112. It should be noted that for the purposes of the current specification and appended drawings and claims, the term initial seed sample may refer to a bulk seed sample that has not yet been treated; a subsample of an untreated bulk seed sample; a previously treated bulk seed sample; a subsample of a previously treated bulk seed sample; a previously treated seed sample; or any combination of the above. In some embodiments the bulk loading station 110 may also include a quantifying device to quantify the seeds loaded into the loading hopper. Examples include, but are limited to, quantifying devices that measure the weight of the seeds, the volume of the seeds, and/or the number of seeds. In the depicted embodiment, the loading hopper 112 is constructed of polyethylene, however in other embodiments the loading hopper 112 may be constructed of any material capable of receiving and at least temporarily holding the initial seed sample B. In the depicted embodiment, the initial seed sample B is manually loaded into the bulk loading station 110 by an operator who pours the initial seed sample B into the bulk loading station 110, however in other embodiments the loading of one or more initial seed samples B may be automated and controlled by one or more controllers, such as for example, controller 40. For instance, in some embodiments, various initial seed samples B may be loaded into an automated seed loading sample device, such as for example, a rotating loading carousel or other distribution device that automatically unloads initial seed samples B into the loading hopper 112. It should be noted that for purposes of the current specification and appended drawings and claims, the term automatic, automatically, and other forms thereof refer to operations that require little if any manual intervention.

In the depicted embodiment, at least a portion of the initial seed sample B is distributed from the loading hopper 112 through a seed guide 114 to the metering station 115. The portion of seeds is distributed to the metering station 115 through the seed guide 114 via pneumatic power (pneumatic power control unit(s) not shown). However, in other embodiments the portion of seeds may be distributed to the metering station 115 by any other means, including, but not limited to, by hydraulic, gravitational, and/or mechanical means, and through closed, open, or a combination of seed guides. In other embodiments, a loading hopper may be disposed directly above the metering station such that seeds from the initial seed sample B feed directly into the metering station 115. In other embodiments, the loading hopper 112 may be integral with the metering station 115, and in still other embodiments the initial seed sample B may be loaded directly into the metering station 115. In the depicted embodiment, the seed guide 114 comprises flexible plastic tubing, however in other embodiments, the seed guide 114 (or any portion or combination of portions of the seed guide) may comprise other types of flexible tubing, such as other types of plastic tubing, or flexible tubing made of other materials, (e.g, corrugated stainless steel). In still other embodiments, the seed guide 114 need not be flexible, and may comprise rigid guides such as PVC or stainless steel piping. It should be noted that other embodiments may not include a metering station 115 such that portions of the initial seed sample B may be distributed from the loading station directly to the seed treater 124.

In general, the metering station 115 of the depicted embodiment includes a cyclone 116, a metering hopper 117, at least one quantifying device 118, and a metering output 119. In the depicted embodiment, one end of the seed guide 114 is attached to an outlet 112B of the loading hopper 112, and the other end of the seed guide 114 is attached to an inlet 116A of the cyclone 116. An outlet 116B of the cyclone 116 distributes the portion of seeds into the metering hopper 117, located below the outlet 116B. In the depicted embodiment, the cyclone 116 operates by venting the air that carries the seeds to the metering station 115 through a top portion of the cyclone 116. Although not all embodiments of the present invention need include cyclones (such as those embodiments that rely on gravity to convey seeds), cyclones may be useful in applications where seed is conveyed pneumatically.

In the depicted embodiment, the metering hopper 117 is constructed of polyethylene, however in other embodiments the metering hopper 117 may be constructed of any material capable of receiving and at least temporarily holding the portion of the seeds delivered from the loading hopper 112. The metering station 115 of the depicted embodiment includes at least one quantifying device 118, located below the metering hopper 117 and configured to quantify seeds received by and/or distributed by the metering station 115. In the depicted embodiment, the quantifying device 118 comprises at least one load cell configured to measure weights of the portions of seeds received by the metering station 115. In various embodiments, this weight information may be used to determine the weight of seed samples received by and/or distributed by the metering station 115. In other embodiments, the quantifying device may be any device configured to quantify any aspect of the seeds received and/or distributed by the metering station 115. Such quantifications may include, but are not limited to, seed counts, seed volumes, and/or seed weights. The metering station 115 may be in communication with the controller 40 so as to control the portions of seeds distributed to the seed treater 124. Additionally, the quantifying device 118 may be in communication with the controller 40 so that information measured by the quantifying device 118 may be stored in the data store 50 and/or used by the controller in subsequent operations of the system 10.

Referring to FIG. 2, the seed treater 124 is configured to receive seed sample C distributed to the seed treater 124 by the metering outlet 119 of the metering station 115. In the depicted embodiment, the seed treater 124 may be a centrifugal coating device (such as, for example the HEGE 11 Liquid Seed Treater manufactured by Wintersteiger AG of Austria). The seed treater 124 may comprise, for example, a bowl 146 for receiving the seed sample C and distributing the seeds within the seed sample C toward radial peripheries of the bowl 146 via an application of centrifugal force (via rotation of a rotatable disk (not visible) disposed concentrically within the bowl and driven for example by drive shaft 151 operably engaged with motor 128). Seed treater 124 may further comprise sample treatment material dispensing devices (not shown) (such as, for example, electro-pneumatic and/or electro-mechanically controlled syringes, or servo motor controlled peristaltic pumps, or piezoelectric, solenoid, piston, or diaphragm pumps) for dispensing the at least one sample treatment material (such as a powdered, semi-liquid, and/or liquid insecticide or fungicide, for example) onto the rotatable disk as the disk is spinning within the bowl 146 such that the sample treatment compound is distributed evenly onto the peripherally-distributed seeds via the applied centrifugal force. Other seed treaters (and/or components thereof) may include, but are not limited to: the HEGE 14 Liquid Seed Treater (also manufactured by Wintersteiger); Wintersteiger's HEGE 12 Liquid Seed Treater (which may be used, for example, to treat seed samples that have been pre-distributed in well-plate sample containers using compressed air to agitate the seeds within the seed sample; the Cimbria Heid CC10 Centricoater (distributed by Seedburo Equipment Company of Chicago Ill.); and Seedburo's Batch Lab Treater (BLT) (manufactured by Seedburo Equipment Company and which includes a rotatable drum for coating relatively small-number seed samples with at least one sample treatment compound). The BLT embodiment of the seed treaters may comprise a rotatable drum sample treatment device configured to separate the seeds within the seed sample and apply the at least one sample treatment material to the seeds within the seed sample via a syringe or other sample treatment dispensing device disposed substantially adjacent to the rotatable drum. Furthermore, the HEGE 12 Liquid Seed Treater embodiments of the seed treaters may comprise magazine sample treatment devices each defining at least one well for receiving a seed sample. The magazine sample treatment devices may further comprise nozzles for selectively conveying a source of compressed air into the at least one well to selectively agitate the seeds within the seed sample. Furthermore, the magazine sample treatment devices may also comprise a sample treatment material dispenser disposed adjacent to the nozzle and configured to apply the at least one sample treatment material to the agitated seeds.

In the depicted embodiment, the seed treater 124 communicates with and is controlled by the controller 40. In such a manner the seed treater 124 (and/or an integrated controller device in associated communication therewith) communicates with the controller 40 of the system 100 in order to ensure that the at least one seed sample treatment material is applied to the seed sample C in accordance with one or more instruction sets, which may be associated with one or more research plans. For example, the controller 40 may control the seed treater 124 (such as by controlling an electro-pneumatic and/or electromechanically-controlled treatment dispensing device) for dispensing the at least one seed sample treatment compound into the seed treater 124 such that the type and/or quantity of seed sample treatment compound may be monitored and/or controlled by the controller 40 in accordance with the received instruction set(s). In some embodiments, information associated with the seed sample C may be used alone or in combination with one or more instruction sets such that the type and/or quantity of seed sample treatment material may be monitored and/or controlled. For example, in the depicted embodiment, quantification information from the quantifying device 118 may be used to monitor and/or control the type and/or amount of seed sample treatment compound applied by the seed treater 124. Specifically, the controller 40 may control the seed treater 124 to apply one or more seed sample treatment materials to the seed sample C based, in part, on the weight of the seed sample C. In other embodiments, the controller 40 may prioritize seed samples to be prepared by the seed treatment apparatus 100 such as by prioritizing based at least in part on one or more instruction sets. As a result, by controlling the treatment of seed samples using, in some embodiments, quantification information associated with the samples to be treated, increased seed treatment accuracy and consistency may be achieved.

In the depicted embodiment, a treated seed sample TC is transported from the seed treater 124 to the seed packaging station 138 via pneumatic power (pneumatic power control unit(s) not shown). However, in other embodiments the treated seed sample TC may be distributed to the packaging station 138 by any other means, including, but not limited to, by hydraulic, gravitational, and/or mechanical means, and through closed, open, or a combination of seed guides. In the depicted embodiment, seed guide 132 comprises flexible plastic tubing, however in other embodiments, the seed guide 132 (or any portion or combination of portions of the seed guides) may comprise other types of flexible tubing, such as other types of plastic tubing, or flexible tubing made of other materials, (e.g, corrugated stainless steel). In still other embodiments, the seed guide 132 need not be flexible, and may comprise rigid piping such as PVC or stainless steel piping. Alternatively, in some embodiments the seed treater 124 may be located vertically above the packaging station 138. In such embodiments, the seed treater 124 may comprise a mechanism for tilting and/or overturning the rotatable bowls 146 and dumping the treated seed sample TC into a hopper device (see, for example, element 136) that may convey the treated seed samples TC to the packaging device 139.

Referring to FIG. 2, in general, the seed packaging station 138 of the depicted embodiment comprises cyclone 135, a packaging hopper 136, and a seed packing device 139. It should be noted that in other embodiments, the apparatus 100 may include one or more additional seed packing stations. The components of the packaging station 138 need not be in communication with a controller, however in the depicted embodiment the packaging device 139 communicates with and is controlled by controller 40. In the depicted embodiment, one end of the seed guide 132 is attached to outlet end 146B of seed treater 124. The other end of the seed guide 132 is attached to inlet end 135A of cyclone 135. An outlet 135B of the cyclone 135 distributes the portion of seeds into the packaging hopper 136, located below the outlet 135B. In the depicted embodiment, the packaging cyclone 135 operates by venting the air that carries the seeds to the packaging station 138 through a top portion of the cyclone 135. The packaging device 139 of the depicted embodiment is configured to receive the treated seed sample TC and to dispense the treated seed sample TC into sample packages (not shown). In some embodiments, the packaging device 139 may automatically dispense the treated seed sample TC into the packages. In additional embodiments, the packaging station 138 may be further configured to cooperate with the controller 40 to associate indicia with the treated seed sample TC. In various embodiments, the indicia may pertain to an identity of the treated seed sample TC, an identity of the research plan corresponding to the treated seed sample TC, information relating to a quantification of the treated seed sample TC, etc. It should be noted that in various other embodiments indicia may pertain, directly or indirectly, to a variety of information. For example, in some embodiments indicia may pertain directly to an identity of the treated seed sample TC and/or the initial seed sample B. In other embodiments, indicia may comprise one or more alpha and/or numeric symbols that pertain, by reference to a data store, to identities of the treated seed sample TC and/or the initial sample B. In other embodiments, indicia may be such that the seed sample and/or bulk sample is at least partially identifiable directly from the indicia. In other embodiments, indicia may represent data contained in an RFID device. It should be noted that in some additional embodiments, more than one sample of seed may be associated with the same indicia.

In various embodiments, the system 100 may further include a device configured to generate a readable representation of the indicia associated with the treated seed sample TC, including, but not limited to, a marking device (such as a laser etching device, ink-jet printing device, and/or laser printing device) or an encoding device (such as an radio frequency identification (RFID) encoder) configured to generate a readable representation of the indicia associated with the sample packages. In the depicted embodiment, a printer 60 is included that communicates with controller 40. In some embodiments, a marking device such as a printer may be integrated into the seed treatment apparatus 100 such that the packaging station 138 may also be configured to physically associate the indicia with the seed sample packages by affixing a label to the seed sample packages. The label generated by the printer 60 may comprise human or machine-readable indicia, such as for example, alphanumeric information, bar code information, or other indicia that may be read by individuals or machines in downstream processes (such as by a bar code scanner included as part of a downstream processing step and/or verification step).

Figure 3:
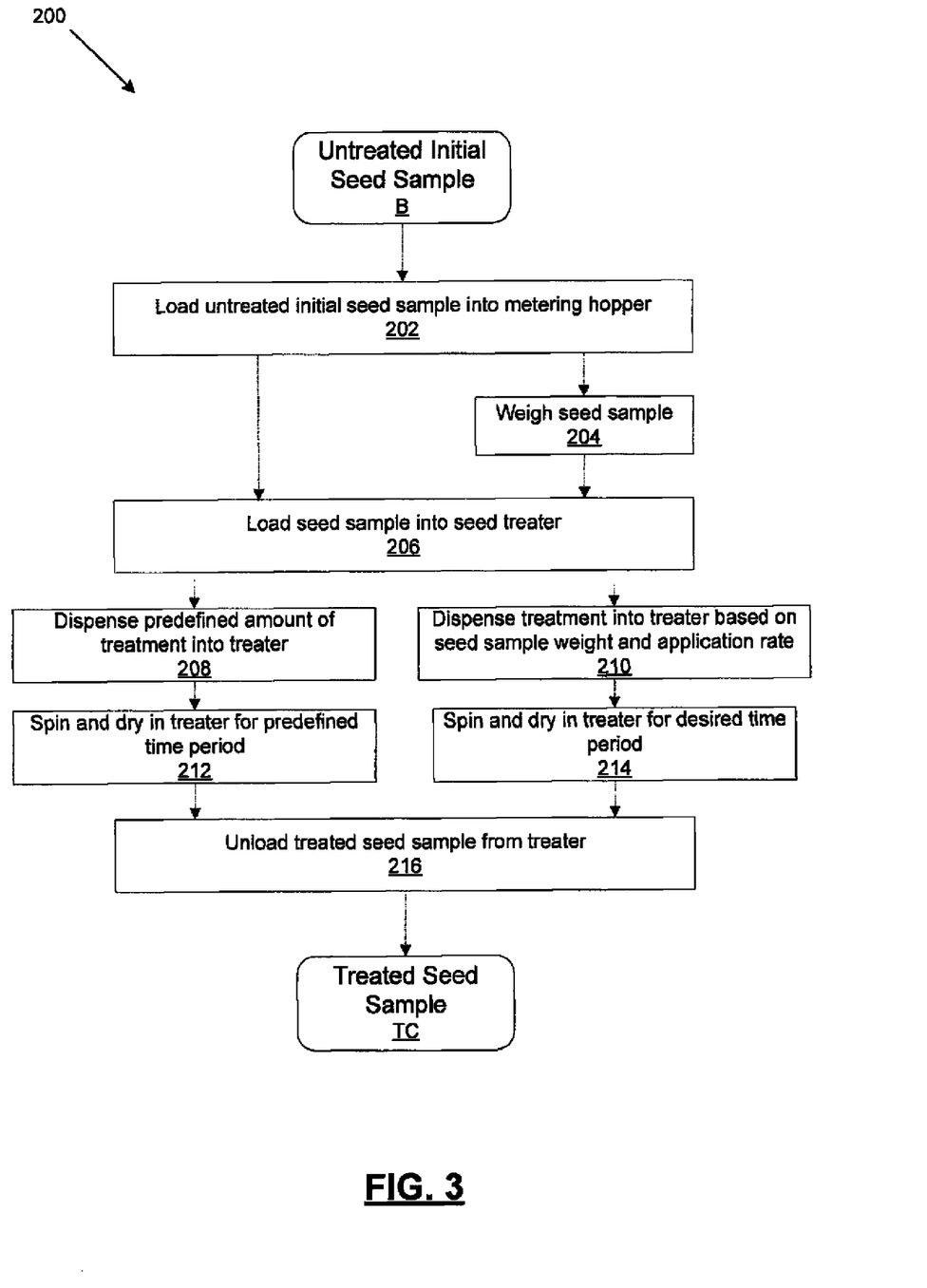
FIG. 3 shows a flow chart of methods of treating a least a portion of an initial seed sample to create one or more treated seed samples, in accordance with various embodiments of the present invention.
Figure 4:
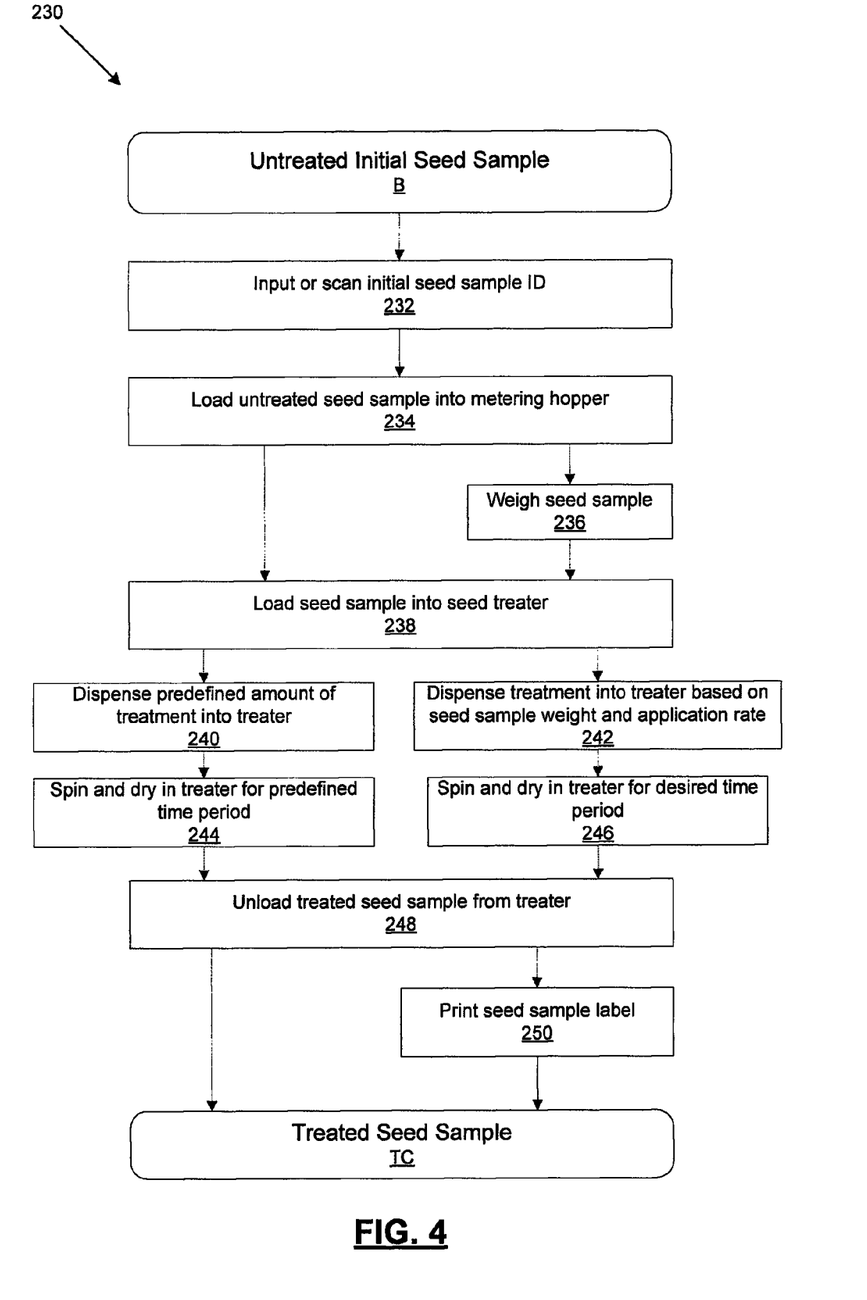
FIG. 4 shows a flow chart of methods of treating a least a portion of an initial seed sample to create one or more treated seed samples, in accordance with various other embodiments of the present invention.
Figure 5:
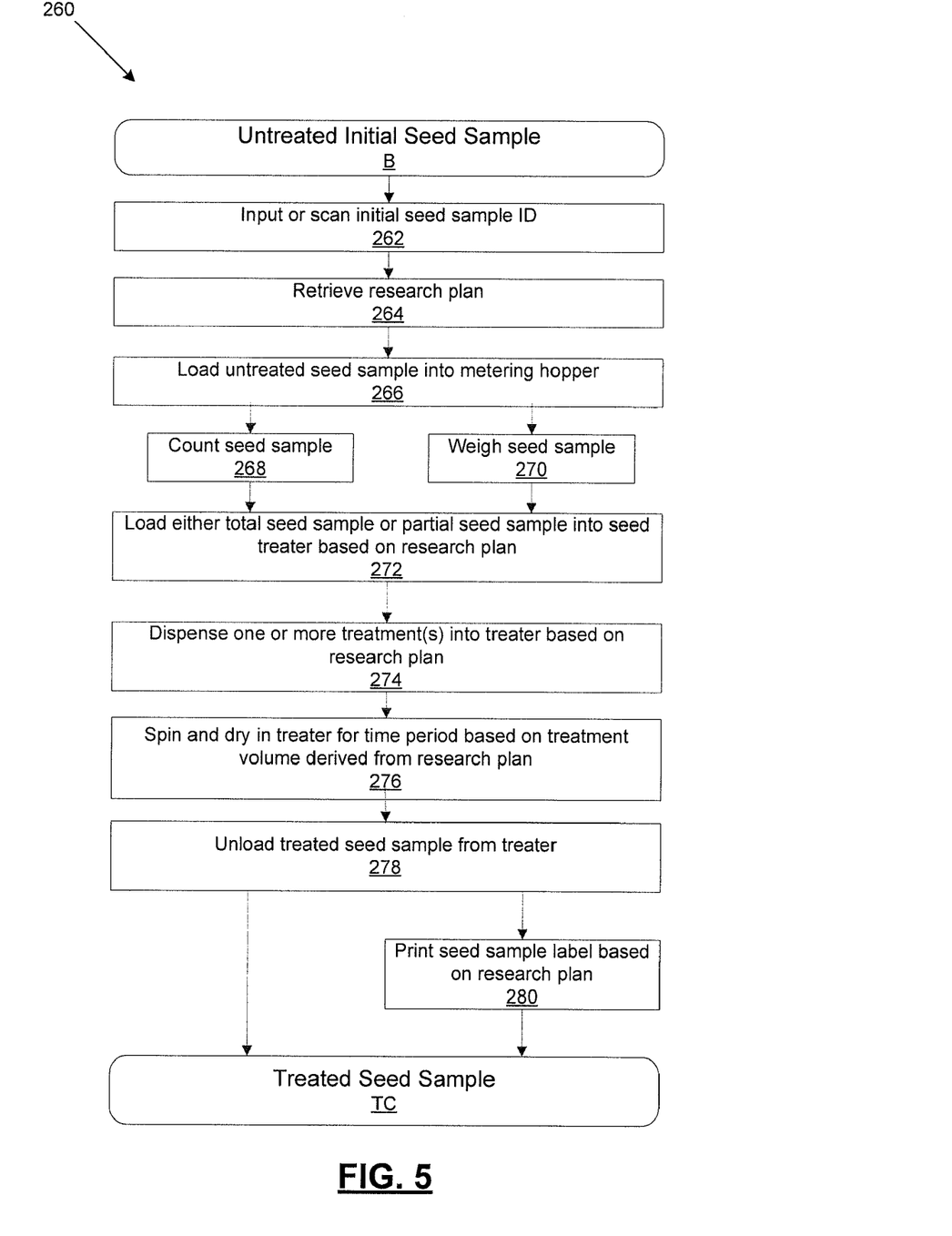
FIG. 5 shows a flow chart of methods of treating a least a portion of an initial seed sample to create one or more treated seed samples, in accordance with still other embodiments of the present invention.

FIGS. 3-5 show several embodiments of methods for treating at least a portion of an initial seed sample to create one or more treated seed samples. Referring to the method 200 shown in FIG. 3, in block 202 an untreated initial seed sample is loaded into the metering hopper. In block 204, one or more seed samples are weighed. As noted above, in some embodiments the seed samples may be weighed by one or more quantifying devices prior to being delivered to the seed treater. In block 206, the seed sample is loaded into the seed treater. In one embodiment, a predefined amount of seed sample treatment material is applied to the seed sample, represented by block 208. In another embodiment, the seed sample treatment material may be applied to the seed sample based on the seed sample weight and an application rate, represented by block 210. In some embodiments the application rate may be predetermined or may relate to a quantification of the seed sample, such as for example, the weight of the seed sample. In other embodiments the application rate may be determined by reference to a database stored in a data store, such as that discussed with respect to data store 50 of FIG. 1. In block 212, after the seed sample has been treated with the seed treatment material, the seed sample is spun and dried for a predefined time period. In another embodiment, represented by block 214, the seed sample is spun and dried for a desired time period. This may be manually determined by an operator, or may be controlled by a controller. In such embodiments, the desired time period may be determined based on the quantification of the seed sample, such as the weight of the seed sample, determined in block 204, and/or the application rate of the treatment material. In such a manner a controller may be configured to determine a drying time based on the quantified seed. In block 216, the treated seed sample TC is unloaded from the treater. As noted above, in some embodiments the treated seed sample may then be transported to a seed packaging device.

FIG. 4 shows another embodiment of a method 230 for treating a least a portion of a bulk seed sample to create one or more treated seed samples. In block 232, an ID of an untreated initial sample is input or scanned, such as by using the data input device 70 shown in FIG. 1. In such a manner, information about the initial seed sample may be gathered and/or stored. Such information may be used for a variety of reasons, including, but not limited to, determining that the initial seed sample is the correct initial seed sample or gathering information for use in a readable label. In block 234 an untreated initial seed sample is loaded into the metering hopper. In block 236, one or more seed samples are weighed. As noted above, in some embodiments the seed samples may be weighed by one or more quantifying devices prior to being delivered to the seed treater. In block 238, the seed sample is loaded into the seed treater.

In one embodiment, a predefined amount of seed sample treatment material is applied to the seed sample, represented by block 240. In another embodiment, the seed sample treatment material may be applied to the seed sample based on the seed sample weight and an application rate, represented by block 242. In some embodiments the application rate may be predetermined or may relate to a quantification of the seed sample, such as for example, the weight of the seed sample. In other embodiments the application rate may be determined by reference to a database stored in a data store, such as that discussed with respect to data store 50 of FIG. 1. In block 244, after the seed sample has been treated with the seed treatment material, the seed sample is spun and dried for a predefined time period. In another embodiment, represented by block 246, the seed sample is spun and dried for a desired time period. In such embodiments, the desired time period may be determined based on the quantification of the seed sample, such as the weight of the seed sample, determined in block 236. In block 248, the treated seed sample is unloaded from the treater. As noted above, in some embodiments the treated seed sample may then be transported to a seed packaging device. In one embodiment, a readable label that includes indicia associated with the treated seed sample is generated as indicated in block 250. In some embodiments, this label may include indicia associated with the treated seed sample and/or the untreated bulk seed sample.

FIG. 5 shows another embodiment of a method 260 for treating a least a portion of an initial seed sample to create one or more treated seed samples. In block 262, an ID of an untreated bulk sample is input or scanned. In such a manner, information about the bulk seed sample may be gathered and/or stored. In block 264, a research plan is retrieved (such as from a data store). In block 266, an untreated bulk seed sample is loaded into the metering hopper. In some embodiments, as indicated in block 268, the seeds of one or more seed samples are counted. As noted above, this may occur via a quantifying device associated with a metering station. In other embodiments, as shown in block 270, one or more seed samples are weighed. As noted above, in some embodiments the seed samples may be weighed by one or more quantifying devices prior to being delivered to seed treater. In still other embodiments, seeds from the seed samples may be weighed and counted. In block 272, the seed sample, or a portion of the seed sample, is loaded into a seed treater. In the depicted embodiment, the seed sample treatment material is then applied to the seed sample based on the research plan, represented by block 274. The manner in which the treatment material is applied may vary. For example, as noted above, the amount and application rate of the treatment material may be determined by a quantification of the seed sample, such as by the weight, volume, and/or number of seeds in the seed sample. This information may be stored in a data store as a result of block 268 and/or block 270. In other embodiments, the amount and application rate of the treatment material may depend on any other factors of the research plan.

In block 276, after the seed sample has been treated with the seed treatment material, the seed sample is spun and dried for a period of time based on the treatment volume derived from the research plan, as opposed to embodiments where the seed sample is spun and dried for a predetermined period of time. In such embodiments, the accuracy and consistency of the application of the treatment material may be increased. In block 278, the treated seed sample is unloaded from the treater. As noted above, in some embodiments the treated seed sample may then be transported to a seed packaging device. In one embodiment, a readable label that includes indicia associated with the treated seed sample is generated as indicated in block 280. In some embodiments, this label may include indicia associated with the treated seed sample and/or the untreated bulk seed sample.

It should be noted that although the system depicted in the figures shows a controller communicating with and controlling a single seed treatment apparatus, in other embodiments a controller (or a combination of controllers) may control two or more seed treatment apparatuses. In such a manner, the controller(s) may be configured to track the locations of particular initial seed samples and/or treated seed samples. In some embodiments, the controller(s) may be configured to monitor the state or condition of the seed treatment apparatuses and to allocate seed to a particular seed treatment apparatus or to indicate to an operator where an initial sample should be directed. In other embodiments, the controller(s) may be configured to monitor the performance of components of the one or more seed treatment apparatuses and/or alert an operator of failures, faults, maintenance items, or other activities that require attention from the operator. Additionally, the controller(s) may provide recommendations relating to prioritization, such as for example, which seed samples should be treated next and with which seed treatment apparatus. Furthermore, the controller(s) may be configured to track the movement of seed samples within the system and to upload data associated with the seed samples, including, but not limited to, information associated with an initial seed sample or information associated with a treated seed sample such as time of treatment, type of treatment, application rate, etc.

As described above and as will be appreciated by one skilled in the art, embodiments of the present invention may be configured as a system and method. Accordingly, embodiments of the present invention may be comprised of various means including entirely of hardware, entirely of software, or any combination of software and hardware. Furthermore, embodiments of the present invention may take the form of a computer program product consisting of a computer-readable storage medium and computer-readable program instructions (e.g., computer software) stored in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, systems, and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As a result, embodiments of the present invention provide a method and system for treating a least a portion of an initial seed sample to create one or more treated seed samples. In various embodiments, one or more seed treatment apparatuses are in communication with one or more controllers such that seed samples treated by the seed treater may be treated at least in part based on one or more research plans. As a result, the method and system are configured to accurately, consistently, and predictably treat seed samples, and to adapt and change the treatment of seed samples based on changing research plans or instruction sets associated therewith.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of treating at least a portion of an initial seed sample to create one or more treated seed samples, the method comprising:

inputting or scanning via an input device identification data associated with the initial seed sample and communicating the identification data to at least one controller;

distributing at least a portion of the initial seed sample to a seed treater of a seed treatment apparatus;

applying at least one seed treatment material to the portion of the initial seed sample distributed to the seed treater; and controlling the seed treatment apparatus with the at least one controller for applying the at least one seed treatment material to the portion of the initial seed sample distributed to the seed treater, wherein the controller controls the seed treatment apparatus at least in part according to one or more instruction sets associated with the identification data of the initial seed sample to create the one or more treated seed samples, and wherein the step of distributing at least a portion of the initial seed sample to a seed treater comprises:

distributing at least a portion of the initial seed sample to a metering station;

distributing at least a portion of the portion of the initial seed sample from the metering station to the seed treater; and quantifying the portion of the initial seed sample distributed by the metering station with a quantifying device, wherein the quantifying step comprises determining a seed sample count of the number of seeds in the initial seed sample distributed by the metering station, and wherein the step of applying at least one seed treatment material to the portion of the initial seed sample distributed to the seed treater is based at least in part on the seed sample count.

2. The method according to claim 1, wherein the one or more instruction sets are derived or extracted from one or more research plans.

3. The method according to claim 2, wherein at least one of the research plans or the instruction sets are stored in at least one data store.

4. The method according to claim 1, further comprising inputting or scanning identification data associated with the one or more treated seed samples using an input device, and communicating the identification data to the at least one controller.

5. The method according to claim 1, wherein the steps of distributing at least a portion of the initial seed sample to the seed treater and applying at least one seed treatment material to the portion of the initial seed sample distributed to the seed treater occur automatically via control by at least one controller.

6. The method according to claim 1, wherein the steps of distributing at least a portion of the initial seed sample to a metering station, distributing at least a portion of the portion of the initial seed sample from the metering station to the seed treater, and quantifying the portions of the initial seed sample distributed by the metering station with a quantifying device, occur automatically via control by at least one controller.

7. The method according to claim 1, wherein the controller controls the seed treatment apparatus at least in part according to the one or more instruction sets by varying one of the group consisting of:

a rate of application of a seed treatment material;
an amount of seed to be treated;
a seed treatment material to be applied; or
combinations thereof.

8. The method according to claim 1, further comprising printing one or more labels containing information associated with the one or more treated seed samples.

9. The method according to claim 1, wherein the step of quantifying the portion of the initial seed sample distributed by the metering station comprises measuring at least one of seed count data, seed weight data, or seed volume data and wherein said method further comprises storing at least one of the seed count data, the seed weight data, or the seed volume data in one or more data stores.

10. The method according to claim 1, further comprising storing data relating to the one or more treated seed samples in at least one data store.

11. A system for treating a least a portion of an initial seed sample to create one or more treated seed samples, the system comprising:
- at least one seed treatment apparatus comprising at least one seed treater configured to receive at least a portion of an initial seed sample and to apply at least one seed treatment material to the portion of the initial seed sample to create the one or more treated seed samples;
- at least one controller configured for controlling the at least one seed treatment apparatus; and
- at least one input device configured to communicate identification data associated with the initial seed sample to the at least one controller,
- wherein the at least one controller is configured to control the at least one seed treatment apparatus at least in part according to one or more instruction sets associated with the identification data of the initial seed sample, and wherein the at least one seed treatment apparatus further comprises a metering station configured to receive at least a portion of the initial seed sample and to distribute at least a portion of the received portion to the seed treater, and wherein the metering station comprises at least one quantifying device for counting seed distributed to the seed treater to determine a seed sample count, and wherein the at least one seed treatment apparatus applies the at least one seed treatment material to the portion of the initial seed sample received by the seed treater based at least in part on the seed sample count.

12. The system according to claim 11, wherein the one or more instruction sets are derived or extracted from one or more research plans and are stored in at least one data store.

13. The system according to claim 11, wherein the seed treater is configured to receive at least a portion of the initial seed sample automatically.

14. The system according to claim 11, wherein the metering station is controlled by at least one controller such that the seed treater receives at least a portion of the portion of the initial seed sample from the metering station automatically.

15. The system according to claim 11, wherein the controller controls the seed treatment apparatus at least in part according to one or more instruction sets by varying one of the group consisting of:
- a rate of application of a seed treatment material;
- an amount of seed to be treated;
- a seed treatment material to be applied; or
- combinations thereof.

16. The system according to claim 11, further comprising a printing device controlled by one or more controllers and configured to print one or more labels containing information associated with the initial seed sample or the one or more treated seed samples.

17. The system according to claim 11, wherein at least one of seed count data, seed weight data, or seed volume data is stored in at least one data store.

18. The system according to claim 11, wherein the input device is configured to communicate input associated with one or more treated seed samples.

19. The system according to claim 11, wherein a data store comprises data relating to the one or more treated seed samples.

* * * * *